J. MIRON.
SAFETY CLEVIS.
APPLICATION FILED JULY 21, 1911.
1,022,041.
Patented Apr. 2, 1912.
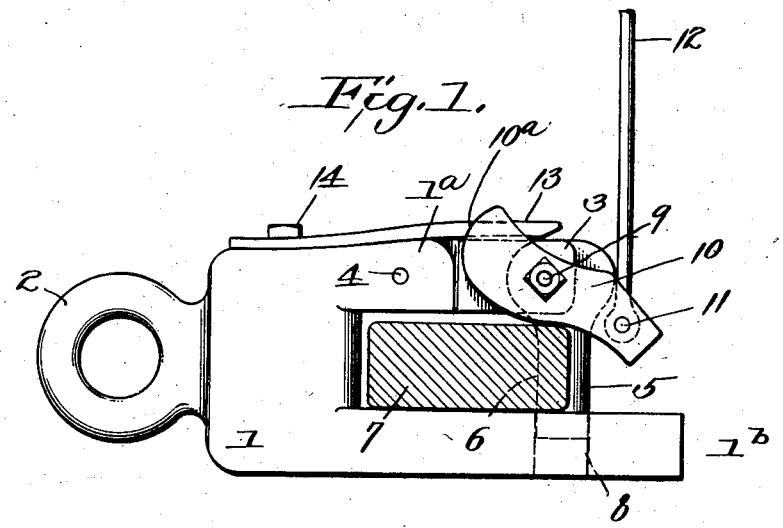
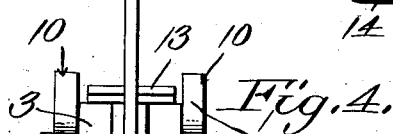
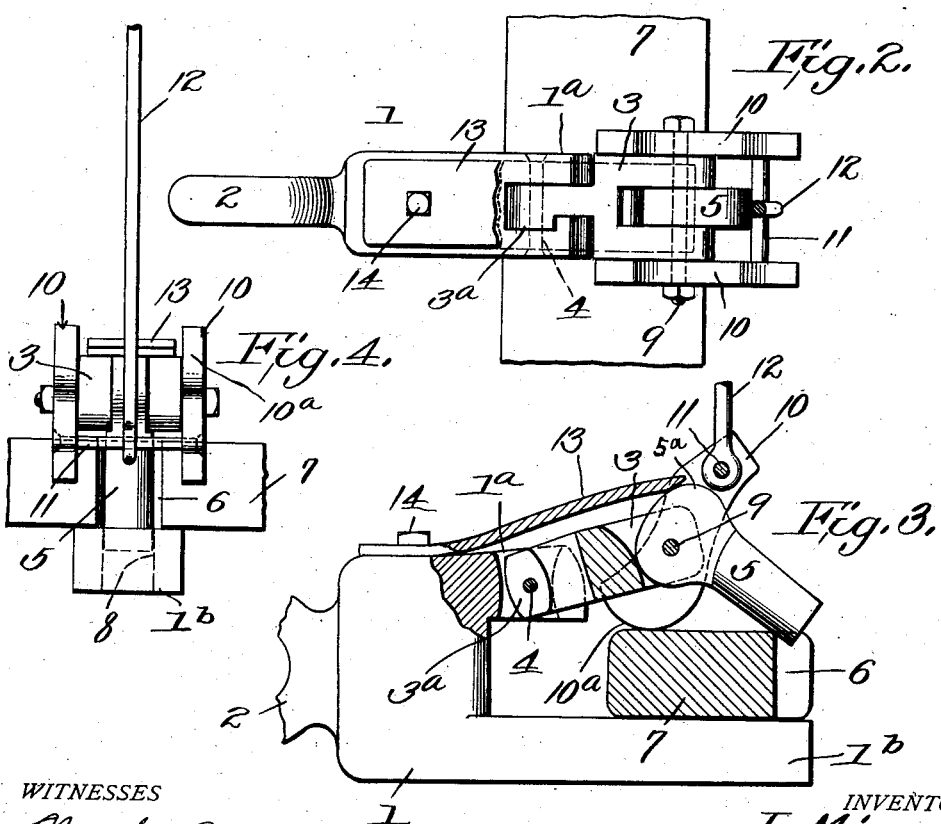
WITNESSES
Oliver H. Holmes
H. B. Cornwall.
INVENTOR
J. Miron
By
Attorney

UNITED STATES PATENT OFFICE.

JOSEPH MIRON, OF WABENO, WISCONSIN.

SAFETY-CLEVIS.

1,022,041. Specification of Letters Patent. Patented Apr. 2, 1912.

Application filed July 21, 1911. Serial No. 639,839.

*To all whom it may concern:*

Be it known that I, JOSEPH MIRON, citizen of the United States, residing at Wabeno, in the county of Forest and State of Wisconsin, have invented certain new and useful Improvements in Safety-Clevises, of which the following is a specification.

The present invention relates to a safety clevis which embodies novel features of construction whereby a horse or other draft animal can be instantly detached from a vehicle or the like in the event the horse gets beyond the control of the driver and there is serious danger of accident.

The object of the invention is the provision of a device of this character which is simple and inexpensive in its construction, which comprises few and durable parts, which will not be caused to accidentally release the horse by the usual jolts and jars of a vehicle or the like, and which can be easily and quickly actuated when necessary and will then act in a positive manner to release the whiffletree engaged by the clevis.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a safety clevis constructed in accordance with the invention, the said clevis being shown in engagement with the whiffletree in its normal position. Fig. 2 is a top plan view of the clevis, the leaf spring thereof being broken away. Fig. 3 is a side elevation showing the clevis with the parts thereof in the position assumed when releasing the whiffletree, portions being broken away and shown in section, and Fig. 4 is a front view of the clevis.

Corresponding and like parts are referred to in the following description and indicated in all the views of the drawings by the same reference characters.

Specifically describing the present embodiment of the invention, the numeral 1 designates the body portion of the clevis which is formed with a short upper arm $1^a$ and a long lower arm $1^b$, some suitable attaching means such as the ring 2 being provided at the base of the clevis for use when attaching the same to a vehicle, pieces of farm machinery, or the like. The end of the short arm $1^a$ is bifurcated to receive the reduced rear end of the main lever 3 which is pivoted upon a pin 4 connecting the arms of the said bifurcation. The reduced rear end of this lever 3 is formed with a lateral enlargement $3^a$ received within a corresponding pocket in one side of the bifurcation and coöperating therewith when the parts are in normal position, as indicated in Fig. 1, to prevent the lever 3 from pulling away from the clevis and relieving the pin 4 of much of the strain which would otherwise be carried thereby. The forward end of the main lever 3 is bifurcated to receive the flattened upper end of a draft pin 5 which is designed to engage a notch 6 in the forward edge of the whiffletree 7, the lower end of the draft pin being normally received within a socket 8 in the long arm $1^b$ of the clevis. The flattened upper end of the draft pin 5 is pivoted upon the bolt 9, the said bolt projecting laterally upon opposite sides of the main lever 3 and having the releasing lever 10 mounted thereon. This releasing lever is formed in two sections arranged upon opposite sides of the main lever and is pivoted upon the bolt 9 at an intermediate point in the length thereof, the rear end of the releasing lever being formed with the cams $10^a$, while the forward end of the releasing lever is provided with a transverse bar 11 to which the releasing rod or wire 12 is connected. A leaf spring 13 is secured to the top of the clevis 1 by some suitable fastening member 14, and this leaf spring normally projects over the main lever 3 so as to bear against the same and hold the parts yieldingly in normal position.

The whiffletree 7 normally bears against the draft pin 5 in the usual manner and is held against longitudinal movement through the clevis by means of the notch 6 therein. Should it be desired to release the draft animal, an upward pull is exerted upon the rod 12 so as to pull the forward end of the releasing lever 10 upward and cause the cams $10^a$ at the rear ends thereof to bear upon the top of the whiffletree 7. A continued pull upon the rod or wire 12 then serves to swing the main lever 3 upward against the action of the leaf spring 13 so as to withdraw the draft pin 5 from the socket 8 and permit the whiffletree to pull through the clevis, as indicated in Fig. 3. By reference to Fig. 3, it will be observed that the flattened upper end of the draft pin 5 is provided at the front thereof with a cam 5ª which is engaged by the end of the leaf spring 13 when the draft pin is swung forwardly to admit of the whiffletree pulling through the clevis. As soon as the whiffletree is entirely released from the clevis, the action of the leaf spring upon the cam 5ª will again spring the draft pin 5 downwardly so that it will enter the socket 8 when the rod or wire 12 is released.

Having thus described the invention, what I claim as new and desire to secure by Letters Patent, is:—

1. In a device of the character described, the combination of a clevis, a main lever pivoted upon one arm of the clevis, a draft pin carried by the main lever and adapted to engage the opposite arm of the clevis, a whiffletree arranged within the clevis so as to bear against the draft pin, and a releasing lever carried by the main lever and adapted to bear against the whiffletree to move the main lever and withdraw the draft pin from operative position.

2. In a device of the character described, the combination of a clevis, a main lever pivoted upon one arm of the clevis, a draft pin pivotally mounted within the main lever and adapted to engage the opposite arm of the clevis, yielding means normally holding the main lever and draft pin in operative position, a whiffletree received within the clevis so as to bear against the draft pin, and a releasing lever pivotally mounted upon the main lever at a point between its ends, one end of the releasing lever being formed with a cam portion adapted to bear against the whiffletree to force the main lever outwardly and withdraw the draft pin from operative position.

3. In a device of the character described, the combination of a clevis formed with a long arm and a short arm, a main lever pivotally mounted within the short arm of the clevis, a draft pin pivotally mounted upon the main lever and adapted to engage the long arm of the clevis, the said draft pin being formed with a cam, a leaf spring extending from the main lever so as to hold the same yieldingly in normal position, the end of the leaf spring coöperating with the cam of the draft pin for normally holding the draft pin in such a position as to engage the long arm of the clevis when moved toward the same, a whiffletree received within the clevis so as to bear against the draft pin, and a releasing lever pivoted upon the main lever and formed with a cam adapted to engage the whiffletree to force the main lever outwardly and withdraw the draft pin from operative position.

In testimony whereof I affix my signature in presence of two witnesses.

JOSEPH MIRON.

Witnesses:
C. G. HIMLEY,
J. BRADLEY.

---

Copies of this patent may be obtained for five cents each, by addressing the "Commissioner of Patents, Washington, D. C."